(12) United States Patent
Ogawa

(10) Patent No.: US 12,437,418 B2
(45) Date of Patent: Oct. 7, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shuhei Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 18/189,930

(22) Filed: Mar. 24, 2023

(65) Prior Publication Data

US 2023/0316540 A1    Oct. 5, 2023

(30) Foreign Application Priority Data

Mar. 30, 2022    (JP) ................................ 2022-056816

(51) Int. Cl.
*G06K 9/00*    (2022.01)
*G06T 7/20*    (2017.01)
*G06T 7/70*    (2017.01)
*G06V 10/44*   (2022.01)
*G06V 10/74*   (2022.01)

(52) U.S. Cl.
CPC ................. *G06T 7/20* (2013.01); *G06T 7/70* (2017.01); *G06V 10/44* (2022.01); *G06V 10/761* (2022.01); *G06V 2201/07* (2022.01)

(58) Field of Classification Search
CPC .. G06T 7/20; G06T 7/246; G06T 7/70; G06T 2207/20081; G06T 2207/20084; G06V 10/44; G06V 10/62; G06V 10/761; G06V 2201/07
See application file for complete search history.

(56) References Cited

U.S. PATENT DOCUMENTS

| | | | |
|---|---|---|---|
| 2016/0196350 A1* | 7/2016 | Mau | G06F 16/24578 707/706 |
| 2019/0130188 A1* | 5/2019 | Zhou | G06T 7/248 |
| 2019/0220967 A1* | 7/2019 | Bhatt | G06T 7/0002 |
| 2020/0005444 A1* | 1/2020 | Tan | G06T 7/75 |

FOREIGN PATENT DOCUMENTS

JP    2021077039 A    5/2021

\* cited by examiner

*Primary Examiner* — Hadi Akhavannik
(74) *Attorney, Agent, or Firm* — Canon U.S.A., Inc. IP Division

(57) ABSTRACT

An information processing apparatus detects a collation target from an image and obtains a predetermined evaluation value between the collation target previously detected and the collation target detected from the image. The information processing apparatus performs collation processing on the collation target detected from the image and the collation target previously detected based on the evaluation value obtained for the collation target detected from the image and a distribution of evaluation values previously obtained.

21 Claims, 13 Drawing Sheets

INFORMATION PROCESSING APPARATUS, INFORMATION PROCESSING METHOD, AND STORAGE MEDIUM

BACKGROUND OF THE DISCLOSURE

Field of the Disclosure

The present disclosure relates to an information processing technique that can be used in, for example, tracking an object in an image.

Description of the Related Art

There is a well-known object matching technique for identifying an object in time-series images constituting a moving image as a technique for detecting and tracking an object in a moving image. In addition, a technique for providing highly accurate tracking using a deep neural network (DNN) has recently attracted attention. Japanese Patent Application Laid-Open No. 2021-77039 discusses a technique of inputting two images captured at different times to a convolution neural network (CNN) and estimating a score used in collation to identify an object in the images, which enables object tracking.

However, the technique discussed in Japanese Patent Application Laid-Open No. 2021-77039 has an issue that a plurality of similar objects in each image can cause a tracking error, deteriorating the tracking accuracy in some cases. In addition, if the appearance of an object greatly varies depending on variations in the movement, orientation, and other characteristics of the object, the technique cannot track the object, deteriorating the tracking accuracy in other cases.

SUMMARY OF THE DISCLOSURE

The present disclosure is directed to providing a technique for attaining highly accurate tracking.

According to an aspect of the present disclosure, an information processing apparatus that tracks a subject includes a memory storing instructions, and a processor which, when executing the instructions, causes the information processing apparatus to detect a collation target from an image, obtain a predetermined evaluation value between the collation target previously detected and the collation target detected from the image, and control tracking of a tracking target by comparing the collation target previously detected with the collation target detected from the image based on the evaluation value obtained for the collation target detected from the image and a distribution of evaluation values previously obtained.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The following exemplary embodiments are not meant to limit the scope of the present disclosure. Not all the combinations of features described in the exemplary embodiments are used in solution of the circumstances in the present disclosure. The configurations of the exemplary embodiments can be appropriately modified or changed depending on the specifications of the apparatus to which the present disclosure is applied and various conditions (use conditions, use environment, etc.). The configurations of the exemplary embodiments may be formed by appropriately combining some of the functions according to the exemplary embodiments to be described below. In the following exemplary embodiments, like numbers refer to like components.

Figure 1:
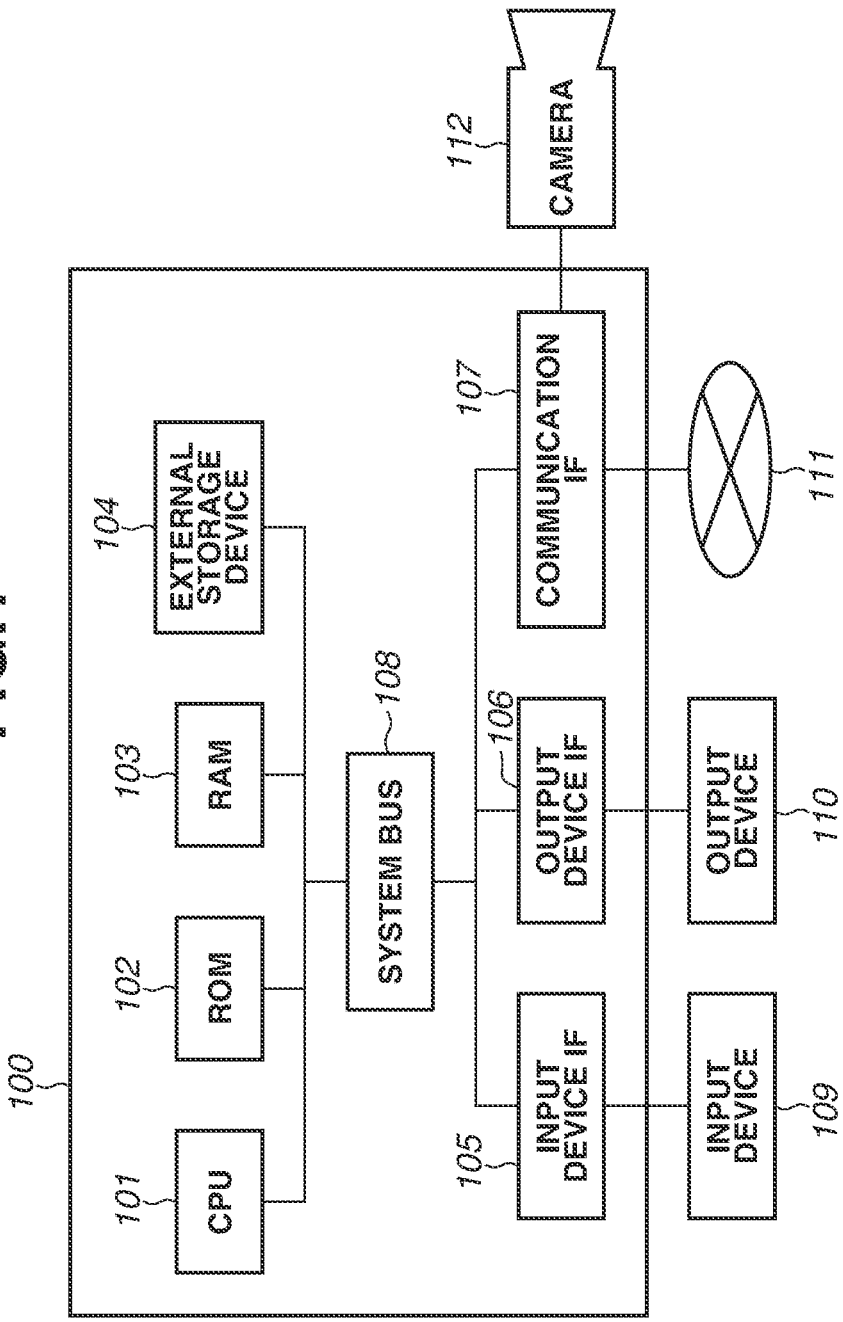
FIG. 1 is a block diagram illustrating a hardware configuration example of an information processing apparatus according to a first exemplary embodiment.

FIG. 1 is a block diagram illustrating a hardware configuration example of an information processing apparatus 100 that can be applied to the exemplary embodiments to be described below. The information processing apparatus 100 illustrated in FIG. 1 may constitute a single apparatus, or may be configured by dividing the functions of the information processing apparatus 100 into a plurality of information processing apparatuses, as appropriate. If the information processing apparatus 100 is composed of a plurality of information processing apparatuses, the information processing apparatuses are interconnected via a local area network (LAN) or another type of network so that the information processing apparatuses can communicate with one another.

In the configuration example illustrated in FIG. 1, the information processing apparatus 100 is connected to an input device 109, an output device 110, the Internet 111, and a camera 112. The connection relationship among these components is not particularly limited. For example, the components may be connected through wiring, or may be connected via wireless communication. The information processing apparatus 100 may be separated from each of the input device 109 and the output device 110. Further, the information processing apparatus 100, the input device 109, and the output device may be integrated together in one apparatus.

The information processing apparatus 100 performs information processing according to the exemplary embodiments to be described below.

The input device 109 is a device for obtaining a user's inputs to the information processing apparatus 100. The input device 109 may be a pointing device or a keyboard by way of example. The output device 110 is a device configured to display data held in the information processing apparatus 100, supplied data input by a user, program run results, and other types of data as images, characters, and the like. The output device 110 is a monitor by way of example.

The camera 112 is an image capturing apparatus configured to obtain captured images. The camera 112 obtains time-series images successively captured at predetermined time intervals, such as images respectively corresponding to frames of a moving image, and supplies the images to the information processing apparatus 100.

A central processing unit (CPU) 101 controls the overall operation of the information processing apparatus 100. The CPU 101 is configured to run various software (computer programs) stored in, for example, an external storage device 104 to perform information processing according to the exemplary embodiments to be described below, and to control the operation of the information processing apparatus 100.

A read-only memory (ROM) 102 stores programs and parameters that are not to be changed. A random access memory (RAM) 103 temporarily stores programs and data supplied from an external apparatus or other sources.

An input device interface (IF) 105 is an interface to connect with the input device 109. An output device IF 106 is an interface to connect with the output device 110. A communication IF 107 is an interface to connect with the Internet 111, the camera 112, and other destinations. The camera 112 may be connected to the information processing apparatus 100 via the Internet 111. The number of cameras 112 to be connected is not limited to one. A plurality of cameras 112 may be connected. A system bus 108 is used to connect the CPU 101, the ROM 102, the RAM 103, the external storage device 104, the input device IF 105, the output device IF 106, and the communication IF 107 so that these units can communicate with one another.

The external storage device 104 is an external storage device that can be read by the information processing apparatus 100, and stores programs, data, and the like for a long period. Examples of the external storage device 104 include a hard disk and a memory card that are fixed and installed in the information processing apparatus 100. Other examples of the external storage device 104 include a flexible disk (FD), an optical disk such as a compact disc (CD), a magnetic card, an optical card, an integrated circuit (IC) card, and a memory card, which can be detachably mounted on the information processing apparatus 100.

Figure 2:
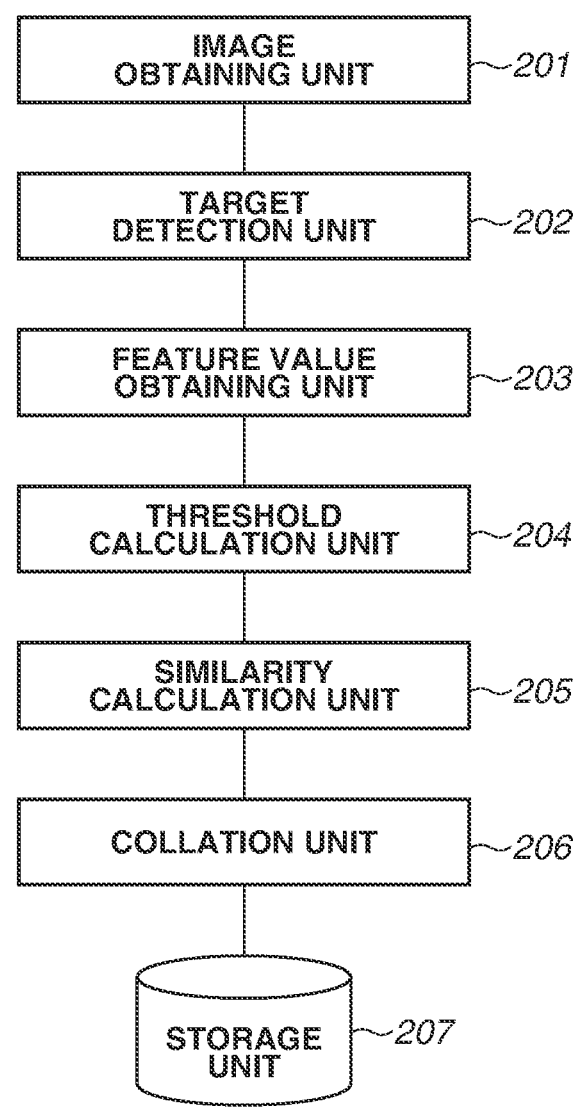
FIG. 2 is a block diagram illustrating a functional configuration example of the information processing apparatus according to the first exemplary embodiment.

A first exemplary embodiment will now be described. FIG. 2 is a block diagram illustrating a functional configuration example of the information processing apparatus 100 according to the first exemplary embodiment. Each functional unit illustrated in FIG. 2 is operated by an information processing program according to the present exemplary embodiment that is stored in the external storage device 104 being loaded into the RAM 103 and the CPU 101 operating based on the program on the RAM 103 by way of example. Programs, various setting data sets, and the like according to the present exemplary embodiment are obtained from the external storage device 104 but the present disclosure is not limited to the example. For example, programs, various setting data sets, and the like may be obtained from a server or the like via a network (not illustrated). Some or all of the functional units illustrated in FIG. 2 may be implemented by hardware components such as circuits.

The information processing apparatus 100 according to the present exemplary embodiment detects a specific object (subject) as a collation target from time-series images. Further, the information processing apparatus 100 performs information processing (object tracking processing) to automatically track the same collation target on the time-series images. In the present exemplary embodiment, an example will be described where a specific object is detected as a collation target from time-series images of a moving image and the detected object is tracked. Unless there is a need to distinguish each object to be collated, the object to be collated is hereinafter referred to as a tracking target. Examples of the tracking target (collation target) include a person and an animal. In the present exemplary embodiment, an example is described where a person is set as a tracking target.

In the following exemplary embodiments, an example will be described where a real-time moving image is obtained from the camera 112 connected to the information processing apparatus 100 and the tracking target in the moving image is tracked. For example, the tracking target in a recorded moving image stored in the external storage device 104 may be tracked. In addition, the present exemplary embodiment can be applied to various cases, including a case where the tracking target in a moving image obtained from a server or the like via a network is tracked.

The information processing apparatus 100 according to the present exemplary embodiment includes an image obtaining unit 201, a target detection unit 202, a feature value obtaining unit 203, a threshold calculation unit 204, a similarity calculation unit 205, and a collation unit 206. These functional units are each connected to a storage unit 207. The storage unit 207 may be included in the information processing apparatus 100.

First, each functional unit will be briefly described.

The image obtaining unit 201 is a functional unit for sequentially obtaining time-series captured images of a moving image captured by the camera 112. In the present exemplary embodiment, an example is described where the tracking target in the moving image obtained from the camera 112 is tracked, and the image obtaining unit 201 obtains images from the camera 112. In the case of using images from the external storage device 104 or another source, the image obtaining unit 201 obtains images from the external storage device 104 or another source.

The target detection unit 202 detects a tracking target (collation target) from the images obtained by the image obtaining unit 201. In the present exemplary embodiment, a person is detected as the tracking target. Information about the tracking target detected by the target detection unit 202 is transmitted to the subsequent-stage feature value obtaining unit 203 and is stored in the storage unit 207. Specifically, the storage unit 207 stores information about each tracking target detected from the time-series images. The tracking target detection processing to be performed by the target detection unit 202 will be described in detail below.

The feature value obtaining unit 203 and the similarity calculation unit 205 are provided as functional units to obtain an evaluation value according to the present exemplary embodiment. The functional units to obtain an evaluation value according to the present exemplary embodiment perform processing for obtaining a predetermined evaluation value used for collation to determine whether the tracking target detected from each image by the target detection unit 202 is identical to the tracking target detected in the previous time-series images.

In this case, the feature value obtaining unit 203 obtains a feature value of each tracking target detected from the images by the target detection unit 202. Information about the feature value obtained for each tracking target by the feature value obtaining unit 203 is transmitted to the similarity calculation unit 205 and is stored in the storage unit 207. Specifically, the storage unit 207 stores the information about the feature value of each tracking target detected from each of the time-series images. The processing of obtaining the feature value for each tracking target in the feature value obtaining unit 203 will be described in detail below.

For simple description, a tracking target detected from an image by the target detection unit 202 is hereinafter referred to as a "tracking target in the current image". A feature value obtained by the feature value obtaining unit 203 from the tracking target in the current image is hereinafter referred to as a "feature value of the tracking target in the current image". A tracking target detected from the previous time-series images is hereinafter referred to as a "tracking target in the previous image", and a feature value of the tracking target in the previous image is hereinafter referred to as a "feature value of the tracking target in the previous image".

The similarity calculation unit 205 obtains a similarity as a predetermined evaluation value between the tracking targets based on the feature value of each tracking target in the current image and the feature value of each tracking target in the previous image. Information about the similarity obtained by the similarity calculation unit 205 is transmitted to the subsequent-stage collation unit 206. The collation unit 206 performs collation processing to be described below on the information. The information and the result of the collation processing (referred to as the collation result) are stored in the storage unit 207. Specifically, the storage unit 207 stores the information about the similarity obtained for each tracking target in the time-series images. In this case, the similarity obtained for each tracking target is associated with the result of collation processing performed by the subsequent-stage collation unit 206 for the tracking target, and the similarity associated with the collation processing result is stored. The similarity obtaining processing to be performed by the similarity calculation unit 205 will be described in detail below.

For simple description, a similarity between the feature value of each tracking target in the current image and the feature value of the tracking target in the previous image that is obtained by the similarity calculation unit 205 is hereinafter referred to as a "similarity of the tracking target in the current image". The similarities obtained for each tracking target in the time-series images and stored in the storage unit 207 in association with the collation processing results are referred to as the "previous similarities of each tracking target".

The threshold calculation unit 204 and the collation unit 206 are provided as evaluation collation functional units according to the present exemplary embodiment. The evaluation collation functional units according to the present exemplary embodiment perform processing for collation of each tracking target based on the similarity of the tracking target in the current image and a distribution of the previous similarities of the tracking target.

In this case, the threshold calculation unit 204 calculates a similarity distribution based on information about the previous similarities of each tracking target stored in the storage unit 207 and calculates a similarity threshold used for the subsequent-stage collation unit 206 to perform collation processing based on the similarity distribution. Specifically, in the present exemplary embodiment, the previous similarities of the tracking target stored in the storage unit 207 are associated with the results of collation processing performed by the collation unit 206. Thus, the threshold calculation unit 204 calculates the similarity threshold based on the similarity distribution depending on the previous collation result. The similarity threshold obtaining processing to be performed by the threshold calculation unit 204 will be described in detail below.

The collation unit 206 performs collation processing to match the tracking targets that are estimated to be identical among the time-series images using the similarity threshold calculated by the threshold calculation unit 204 and the similarity of each tracking target in the current image. As a matching method, for example, a Hungarian algorithm can be used.

The storage unit 207 stores various types of information such as information indicating each tracking target obtained from the time-series images as described above, the feature value of the tracking target in the previous image, the previous similarities of the tracking target, and identification information to identify the tracking target as described below.

Figure 3:
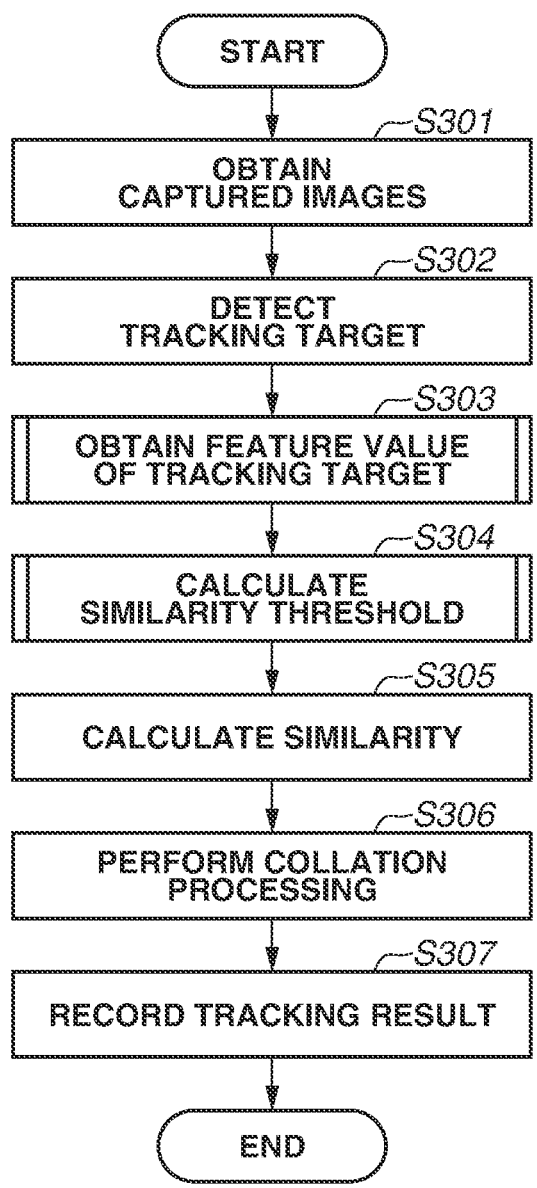
FIG. 3 is a flowchart illustrating an information processing procedure according to the first exemplary embodiment.

FIG. 3 is a flowchart illustrating a procedure of information processing to be performed by the information processing apparatus 100 according to the present exemplary embodiment. The processing to be performed by the functional units illustrated in FIG. 2 will be described in detail with reference to the flowchart illustrated in FIG. 3. Not all steps described in each flowchart to be described below may be performed by the information processing apparatus 100. The order of steps in each flowcharts to be described below may be changed as appropriate.

In step S301, the image obtaining unit 201 obtains time-series captured images constituting a moving image from the camera 112. While in the present exemplary embodiment, an example is described where the image obtaining unit 201 obtains the images from the camera 112 connected to the information processing apparatus 100, the image obtaining unit 201 may obtain the images from the external storage device 104 or the source as described above.

In step S302, the target detection unit 202 detects a tracking target from the images obtained by the image obtaining unit 201. An object can be detected using a technique discussed by "Liu, SSD: Single Shot Multibox Detector, in ECCV 2016" as a technique for detecting an object as a tracking target from an image. Assume herein that an object detector for detecting an object from an image is trained in advance so that the tracking target can be detected. This object detector can give information about a predetermined rectangular area (hereinafter referred to as a bounding box (BB)) surrounding the tracking target as information indicating the detected tracking target. Information indicating a BB is hereinafter abbreviated as BB information. The BB information indicates the location and size of the BB in each captured image. One or more tracking targets may be set. If a plurality of tracking targets is set, BB information is obtained for each tracking target. The target detection unit 202 determines identification information (ID information) for each tracking target detected from the time-series images, adds the ID information to the BB information for each tracking target, and stores the information in the storage unit 207.

In step S303, the feature value obtaining unit 203 extracts a rectangular image area corresponding to the location and size indicated by the BB information from the images obtained by the image obtaining unit 201. The feature value obtaining unit 203 obtains an image feature value from the extracted image area, and uses the image feature value as the feature value of the tracking target. If a person is set as the tracking target like in the present exemplary embodiment, the feature value of the tracking target is set as reference information for person identification that is obtained by digitizing information that can be used to identify each person, such as information indicating the face, head, upper body, lower body, clothes, gait, and body shape of each person in the images.

Figure 4:
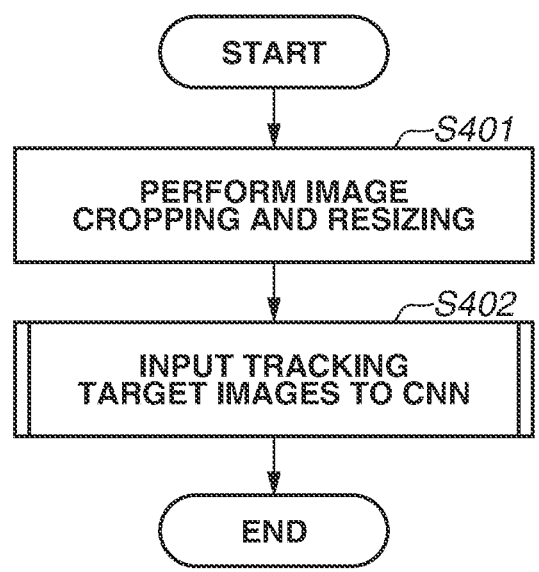
FIG. 4 is a flowchart illustrating a processing procedure of obtaining a feature value of a tracking target.

FIG. 4 is a detailed flowchart illustrating the processing of obtaining the feature value of each tracking target in step S303.

In step S401, the feature value obtaining unit 203 performs cropping processing to crop a rectangular image area from the images obtained by the image obtaining unit 201 based on the BB information about the tracking target obtained by the target detection unit 202. Further, the feature value obtaining unit 203 performs resizing processing on the image area cropped in the cropping processing.

Figure 5B:
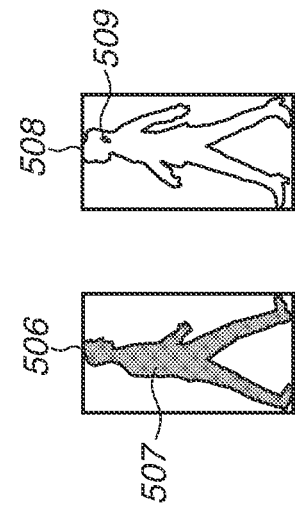
FIGS. 5A and 5B each illustrate an example of a tracking target obtained from an image.
Figure 5A:
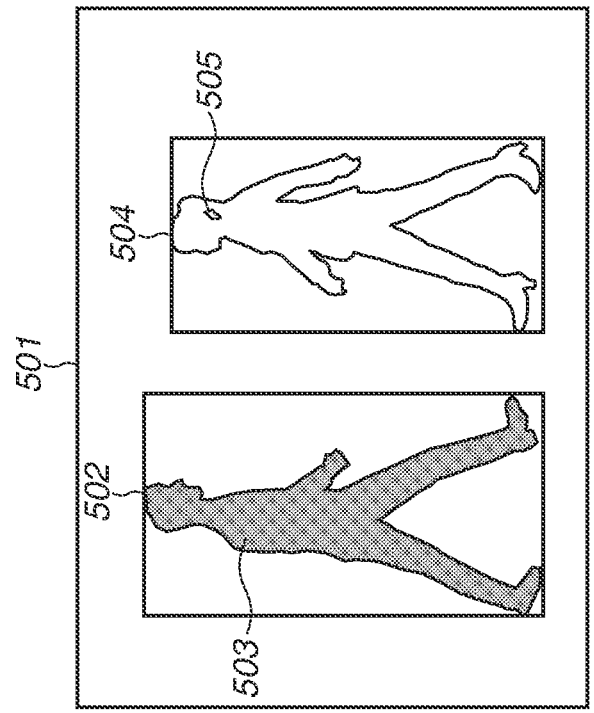

FIGS. 5A and 5B illustrate cropping processing and resizing processing.

An image 501 illustrated in FIG. 5A is an example of an image obtained by the image obtaining unit 201. Tracking targets 503 and 505 are captured in the image 501. The example of the image 501 includes a BB 502 representing a rectangular bounding box obtained by detecting the tracking target 503, and also includes a BB 504 corresponding to the tracking target 505. The feature value obtaining unit 203 performs cropping processing on the image 501 based on the BB information about the BB 502 and the BB 504, and also performs resizing processing on the image area cropped in the cropping processing.

FIG. 5B illustrates an example of images obtained by the cropping processing and resizing processing. An image obtained after the cropping processing and resizing processing is hereinafter referred to as a tracking target image. A tracking target image 506 illustrated in FIG. 5B is an example of the image on which the cropping processing and resizing processing are performed based on the BB 502 illustrated in FIG. 5A, and a tracking target 507 corresponds to the tracking target 503 illustrated in FIG. 5A. Similarly, a tracking target image 508 is an example of the image on which the cropping processing and resizing processing are performed based on the BB 504 illustrated in FIG. 5A, and a tracking target 509 corresponds to the tracking target 505 illustrated in FIG. 5A.

The feature value obtaining unit 203 inputs each tracking target image obtained by the cropping processing and resizing processing as described above to a trained model of a convolution neural network (CNN). The CNN is trained in advance so as to obtain feature values based on which different tracking targets can easily be distinguished from each other. Specifically, in step S402, the feature value obtaining unit 203 inputs each tracking target image to the CNN, thereby obtaining a feature value of each tracking target in the current image.

Figure 6:
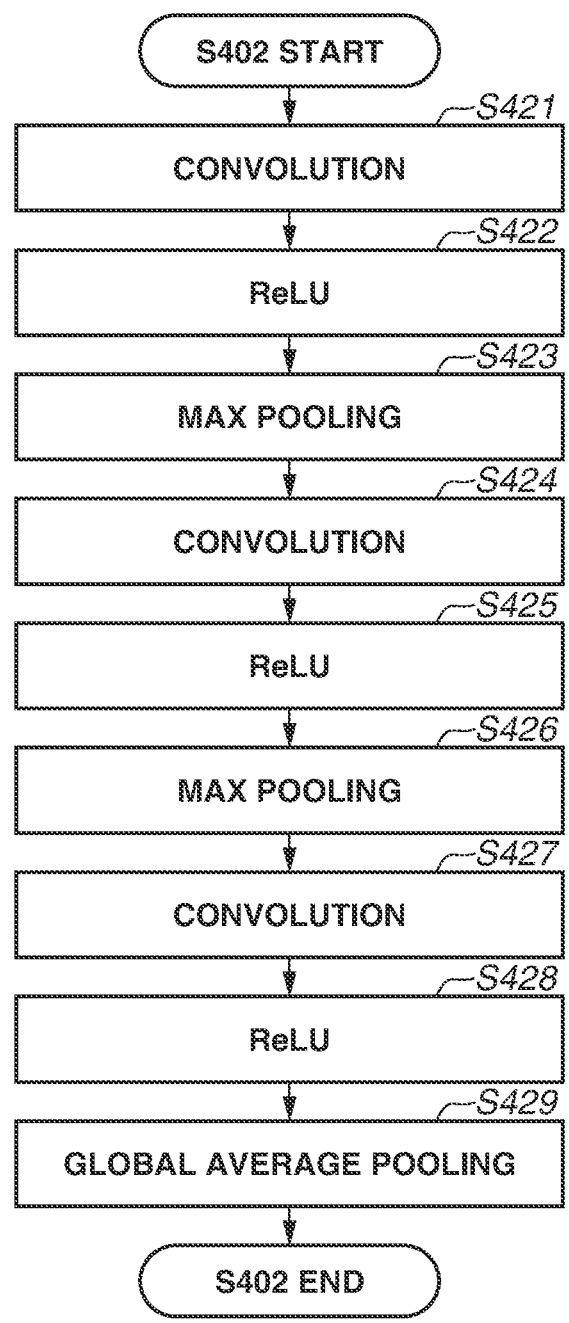
FIG. 6 is a flowchart illustrating a convolution neural network (CNN) processing procedure.

FIG. 6 is a flowchart illustrating a procedure of CNN processing performed by the feature value obtaining unit 203 in step S402. The CNN involves conversion processing such as convolution, rectified linear unit (ReLU), max pooling, and global average pooling. The processing of convolution, ReLU, max pooling, and global average pooling is known processing, and thus detailed descriptions thereof are omitted. In step S421, the feature value obtaining unit 203 performs convolution processing. In step S422, the feature value obtaining unit 203 performs ReLU processing. In step S423, the feature value obtaining unit 203 performs max pooling processing. In step S424, the feature value obtaining unit 203 performs convolution processing. In step S425, the feature value obtaining unit 203 performs ReLU processing. In step S426, the feature value obtaining unit 203 performs max pooling processing. In step S427, the feature value obtaining unit 203 performs convolution processing. In step S428, the feature value obtaining unit 203 performs ReLU processing. In step S429, the feature value obtaining unit 203 performs global average pooling processing. The ReLU processing and max pooling processing described in the present exemplary embodiment are merely examples. Instead of the ReLU processing, Leaky ReLU, a sigmoid function, or other processing may be used. Instead of the max pooling processing, average pooling or other processing may be used. These processing operations according to the present exemplary embodiment are not particularly limited.

Referring again to FIG. 3, the description of the flowchart is continued.

Figure 7:
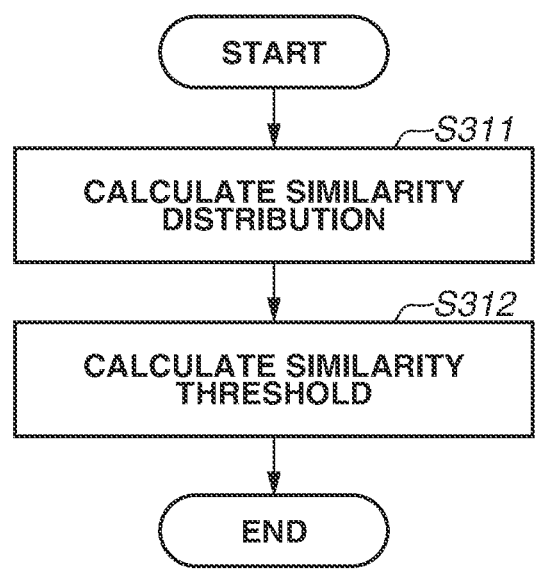
FIG. 7 is a flowchart illustrating a processing procedure of calculating a similarity threshold.

In step S304, the threshold calculation unit 204 performs similarity threshold calculation processing to determine a similarity threshold. The similarity threshold is used to determine that two tracking targets are identical if a calculated similarity between the two tracking targets is more than or equal to the similarity threshold. In the first exemplary embodiment, as illustrated in the flowchart of FIG. 7 to be described below, the threshold calculation unit 204 calculates a similarity distribution based on the information about the previous similarities of each tracking target stored in the storage unit 207, and determines the similarity threshold based on the similarity distribution.

In step S305, the similarity calculation unit 205 calculates the similarity of each tracking target in the current image based on the feature value of the tracking target in the current image and the feature value of the tracking target in the previous image. For example, when the feature value of the tracking target detected from the image at time t is used as the feature value of the tracking target in the current image, the similarity calculation unit 205 calculates the similarity between the feature values of the tracking targets in the current image and in the previous image at time t−1 by way of example. In the present exemplary embodiment, the similarity is obtained as the cosine distance between the feature values of the two tracking targets detected in the images at different times. For example, when the feature value of one of the two tracking targets is represented by $f_1$ and the feature value of the other of the two tracking targets is represented by $f_2$, a similarity "s" between the tracking targets is obtained by the following expression (1).

$$s(f_1, f_2) = \frac{f_1 \cdot f_2}{|f_1||f_2|} \quad (1)$$

As described above, the similarity calculation unit 205 calculates the similarity between the feature values of the tracking targets detected from the images at different times in the moving image. Information about the similarity calculated for each tracking target is associated with the result of collation processing performed by the subsequent-stage collation unit 206, and the information is stored in the storage unit 207. Specifically, there are two types of collation processing result: a collation result indicating that the tracking targets are determined to be identical, and a collation result indicating that the tracking targets are determined to be different. The storage unit 207 stores the similarity information associated with the collation result indicating that the tracking targets are determined to be identical or the collation result indicating that the tracking targets are determined to be different.

For simple description, the similarity between the tracking targets determined to be identical at different times is hereinafter referred to as the "similarity between identical tracking targets". On the other hand, the similarity between the tracking targets determined to be different is hereinafter referred to as the "similarity between different tracking targets".

In the example illustrated in FIG. 3, the similarity threshold calculation processing in step S304 is performed and then the similarity calculation processing in step S305 is performed. Instead, the similarity calculation processing in step S305 can be performed before the similarity threshold calculation processing in step S304.

FIG. 7 is a flowchart illustrating a detailed procedure of the similarity threshold calculation processing performed by the threshold calculation unit 204 in step S304.

In step S311, the threshold calculation unit 204 first obtains the previous similarities "s" of each tracking target that are previously calculated using Expression (1) by the similarity calculation unit 205 and are stored in the storage unit 207. Further, the threshold calculation unit 204 obtains a similarity distribution using the previous similarities "s" of each tracking target obtained from the storage unit 207. In this case, the previous similarities "s" of each tracking target stored in the storage unit 207 are associated with a collation result as described above. Thus, the threshold calculation unit 204 calculates the similarity distribution based on the previous collation result. In the first exemplary embodiment, the threshold calculation unit 204 calculates an average $\text{inter}_{mean}$ of the similarities between different tracking targets as a statistic based on the similarity distribution by Expression (2), and also calculates a standard deviation $\text{inter}_{std}$ of the similarities between different tracking targets by Expression (3). Instead, a variance may be obtained as the statistic based on the similarity distribution.

$$\text{inter}_{mean} = \frac{1}{N} \sum_{i} \sum_{j \neq i} s(\bar{f}_i, \bar{f}_j) \quad (2)$$

$$\text{inter}_{std} = \sqrt{\frac{1}{N} \sum_{i} \sum_{j \neq i} (s(\bar{f}_i, \bar{f}_j) - \text{inter}_{mean})^2} \quad (3)$$

where $\bar{f}_i$ represents the average feature value of the identical tracking targets.

Further, the threshold calculation unit 204 calculates a similarity threshold Th by the following expression (4) using the average $\text{inter}_{mean}$ of the similarities and the standard deviation $\text{inter}_{std}$. In Expression (4), λ represents a hyperparameter empirically determined.

$$Th = \text{inter}_{mean} + \lambda \text{inter}_{std} \quad (4)$$

Figure 8:
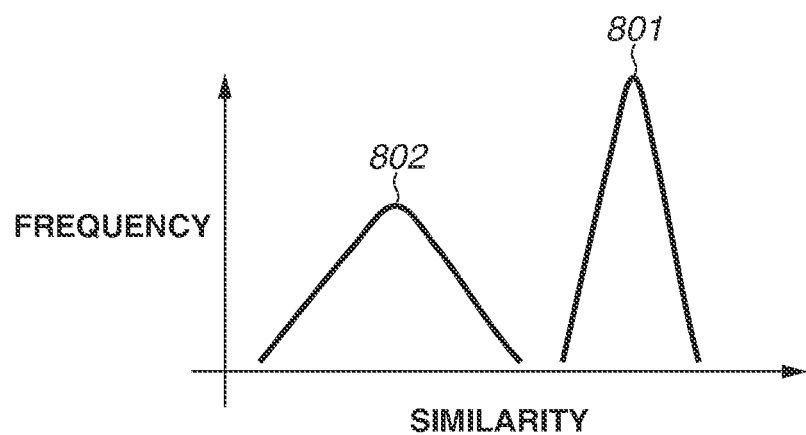
FIG. 8 is a graph illustrating an example of a similarity distribution.

FIG. 8 is a graph illustrating an example of the similarity distribution. An example of similarity threshold calculation processing based on the similarity distribution by the threshold calculation unit 204 will be described with reference to the similarity distribution example.

A curve 802 illustrated in FIG. 8 represents an example of the similarity distribution formed by the similarities between different tracking targets. A curve 801 illustrated in FIG. 8 will be described below in Modified Example 1. When the similarities between different tracking targets are distributed over a higher range like in the similarity distribution indicated by the curve 802, it is highly likely that various tracking targets with similar feature values are congested and coexist in the image. In this situation, the subsequent-stage collation unit 206 is likely to cause a matching error, or to erroneously determine different tracking targets to be identical tracking targets.

For this reason, if the similarities between different tracking targets are distributed over a higher range, the threshold calculation unit 204 according to the first exemplary embodiment performs calculation using Expressions (2) to (4) so that the similarity threshold can be set to a higher value. According to Expressions (2) to (4), the similarity threshold is set to a higher value as the similarities between different tracking targets are distributed over a higher range. Specifically, the threshold calculation unit 204 according to the first exemplary embodiment sets the similarity threshold to a higher value as the average, standard deviation, or variance of the similarities between different tracking targets increases.

Referring again to FIG. 3, the description of the flowchart is continued.

In step S306, the collation unit 206 performs collation processing to match the tracking targets that are estimated to be identical among the time-series images based on the similarity threshold Th calculated in step S304 and the similarity of each tracking target in the current image calculated in step S305. Specifically, if the similarity of each tracking target in the current image is more than or equal to the similarity threshold Th, the collation unit 206 obtains the collation result indicating that the tracking target in the previous image used in calculation of the similarity with the feature value of the tracking target in the current image by the similarity calculation unit 205 is identical to the tracking target in the current image. On the other hand, if the similarity of each tracking target in the current image is less than the similarity threshold Th, the collation unit 206 obtains the collation result indicating that the tracking target in the previous image used in calculation of the similarity with the feature value of the tracking target in the current image by the similarity calculation unit 205 is different from the tracking target in the current image. In the first exemplary embodiment, the similarity threshold is set to a higher value as the similarities between different tracking targets are distributed over a higher range. This reduces the possibility of a matching error by the collation unit 206 even if different tracking targets with similar feature values are congested.

Assume herein that the similarities between the tracking targets in the current image detected by the target detection unit 202 and the tracking targets in the previous image stored in the storage unit 207 are obtained as illustrated in Table 1 described below, for example. Specifically, Table 1 illustrates a similarity matrix between persons A, B, and C as tracking targets in the previous image at time t−1 and persons D and E as tracking targets in the current image at time t. The values in Table 1 indicates similarities between the persons in the respective rows (persons A, B, and C in the previous image at time t−1) and the persons in the respective columns (persons C and D in the current image at time t). The value of each similarity closer to "1" in Table 1 indicates that the person in the previous image at time t−1 is more similar to the person in the current image at time t.

TABLE 1

| Similarity Matrix | | | |
| --- | --- | --- | --- |
| | A | B | C |
| D | 0.8 | 0.1 | 0.1 |
| E | 0.2 | 0.4 | 0.2 |

As collation processing in step S306, the collation unit 206 performs matching processing between tracking targets (persons) at different times based on the similarity of each tracking target in the current image obtained in step S305 and the similarity threshold calculated in step S304 as described above. With the similarity matrix as illustrated in Table 1, the following matching result (collation result) is obtained by the collation unit 206.

As illustrated in Table 1, two persons D and E are detected from the image at time t, and three persons A, B, and C are detected from the previous image at time t−1. Assuming that the calculated similarities between the persons A, B, and C and the persons D and E are values as illustrated in Table 1, it is obvious that the person A is most similar to the person D and the person B is most similar to the person E. For example, if the similarity threshold calculated in step S304 is 0.5, the similarity between the person D and the person A is 0.8, which is more than the similarity threshold (0.5). Thus, the collation unit 206 determines that the person D is identical to the person A. On the other hand, the similarity between the person E and the person B is 0.4, which is less than the similarity threshold, the collation unit 206 determines that the person E and the person B are not identical and the person E is the person that has newly appeared. Further, the collation unit 206 adds the same identification information to the persons (A, D) determined to be identical, and adds new identification information to the person (E) that has newly appeared. In other words, in the example illustrated in Table 1, the person D at time t is tracked as the person identical to the person A at time t−1.

Referring again to FIG. 3, the description of the flowchart is continued.

In step S307, the collation unit 206 records information about the tracking result based on the collation processing in step S306 on the storage unit 207. The information to be recorded on the storage unit 207 in this case includes BB information about each tracking target, the feature value of each tracking target, ID information about each tracking target, and the similarity of each tracking target associated with the collation result.

As described above, the information processing apparatus 100 according to the first exemplary embodiment calculates the similarity threshold based on the distribution of similarities between different tracking targets. This allows the information processing apparatus 100 according to the first exemplary embodiment to reduce the occurrence of matching errors even if different tracking targets with similar feature values are congested. In other words, the information processing apparatus 100 according to the first exemplary embodiment provides a highly accurate tracking with reduced collation errors due to matching errors that lead to a smaller number of occurrences of tracking errors.

Modified Example 1

The threshold calculation unit 204 according to the first exemplary embodiment described above calculates the similarity threshold Th based on the calculations using Expressions (2) to (4). Specifically, in the first exemplary embodiment, the similarity threshold is calculated based on the distribution of similarities between different tracking targets.

In Modified Example 1 of the first exemplary embodiment, an example will be described where the similarity threshold is calculated based on a distribution of similarities between identical tracking targets, or a distribution of similarities between tracking targets determined to be identical at different times.

According to Modified Example 1, in step S311 illustrated in FIG. 7, the threshold calculation unit 204 calculates the distribution of similarities between identical tracking targets. In the subsequent step S312, the threshold calculation unit 204 calculates the similarity threshold based on the similarity distribution.

Specifically, the threshold calculation unit 204 according to Modified Example 1 calculates the similarity threshold Th based on the distribution of similarities between identical tracking targets by calculating the following expressions (5) to (8). In Expressions (5) to (8), $intra_{mean}$ represents the average of the similarities between identical tracking targets, and $intra_{std}$ represents the standard deviation of the similarity between identical tracking targets. Specifically, in Modified Example 1, the threshold calculation unit 204 calculates the average $intra_{mean}$ of the similarities between identical tracking targets as the statistic based on the similarity distribution by Expressions (5) and (7). Further, the threshold calculation unit 204 calculates the standard deviation $intra_{std}$ of the similarity between identical tracking targets by Expressions (6) and (7). A variance may be obtained as the statistic based on the similarity distribution instead. Further, the threshold calculation unit 204 calculates the similarity threshold Th by Expression (8) using the average $intra_{mean}$ of the similarities and the standard deviation $intra_{std}$.

$$intra_{mean} = \frac{1}{N}\sum_i \overline{s_i} \tag{5}$$

$$intra_{std} = \frac{1}{N}\sum_i (\overline{s_i} - intra_{mean})^2 \tag{6}$$

$$\overline{s_i} = \frac{1}{T}\sum_i s(f_i^t, f_i^{t-1}) \tag{7}$$

$$Th = intra_{mean} - \lambda intra_{std} \tag{8}$$

The curve 801 illustrated in FIG. 8 indicates an example of the distribution of similarities between tracking targets that are determined to be identical in the collation at different times in the time-series images. In this case, if the appearance of the identical tracking target greatly varies with time due to such causes as variations in the movement and orientation of the tracking target, the feature value of the identical tracking target at different times greatly varies. In this case, it is considered that the similarity between the feature values of identical tracking targets decreases. As a result, it is considered that in matching processing by the collation unit 206, each tracking target is more likely to be lost.

For this reason, if the similarities between identical tracking targets are distributed over a lower range, the threshold calculation unit 204 according to Modified Example 1 sets the similarity threshold to a lower value by calculating Expressions (5) to (8). According to Expressions (5) to (8), the similarity threshold is set to a lower value as the similarities between identical tracking targets are distributed over a lower range. That is, according to Expressions (5) to (8), the similarity threshold is set to a lower value as the standard deviation or variance of the similarity between identical tracking targets increases. On the other hand, the similarity threshold is set to a higher value as the standard deviation or variance of the similarity between identical tracking targets decreases. In other words, according to Expressions (5) to (8), the similarity threshold is set to a higher value as the average of similarities between identical tracking targets increases.

Thus, according to Modified Example 1, in step S306 illustrated in FIG. 3, the collation unit 206 performs collation processing on the tracking target using the similarity threshold calculated in Expression (8). Thus, in Modified Example 1, the collation unit 206 can prevent the tracking target from being lost even when the feature value of the identical tracking target greatly varies with time, thereby providing highly accurate tracking. In Modified Example 1, the processing of step S307 and subsequent steps is similar to the processing described above.

In the first exemplary embodiment described above, an example has been described where the similarity threshold is calculated based on the distribution of similarities between different tracking targets, and in Modified Example 1, an example is where the similarity threshold is calculated based on the distribution of similarities between identical tracking targets. However, the similarity threshold may be calculated based on both the distribution of similarities between different tracking targets and the distribution of similarities between identical tracking targets. In this case, for example, as the average of similarities between identical tracking targets decreases, and the average of similarities between different tracking targets increases, the similarity threshold is set to a higher value. In addition, for example, the higher of the two, the similarity threshold calculated based on the distribution of similarities between identical tracking targets and the similarity threshold calculated based on the distribution of similarities between different tracking targets, can be set as the similarity threshold.

Modified Example 2

In the first exemplary embodiment described above, an example has been described where the similarity calculation unit 205 calculates the similarity by Expression (1).

In Modified Example 2 of the first exemplary embodiment, an example will be described where the similarity calculation unit 205 calculates a similarity $s_2$ by adding an evaluation value for the location of each tracking target as represented by, for example, the following expression (9).

$$s_2(p_1, f_1, p_2, f_2) = s(f_1, f_2) + \lambda s_p(p_1, p_2) \qquad (9)$$

In Expression (9), $p_1$ and $p_2$ represent locations of the tracking target in the images at different times, and $s_p$ represents an index based on the Euclidean distance between $p_1$ and $p_2$. This index $s_p$ can be calculated by the following expression (10). That is, the index $s_p$ corresponds to the evaluation value for the location of each tracking target (similarity between locations of each tracking target). In Expression (9), $\lambda$ represents a parameter for balancing between the similarity between the feature values of the tracking target obtained from the CNN and the similarity between the locations of the tracking target. The value $\lambda$ is empirically determined. In this case, it can be considered that if the tracking targets are identical, the tracking targets tend to appear at the same location or close locations, or at similar locations, in the image, for example, at time t and time t−1. For this reason, the similarity calculation unit 205 according to Modified Example 2 sets the index $s_p$ to a higher value as the Euclidean distance between tracking targets at different times, such as at time t and time t−1, decreases. That is, in Modified Example 2, the similarity between the locations of the tracking target increases as the Euclidean distance between the tracking targets at different times decreases, with the result that the similarity $s_2$ calculated by Expression (9) increases.

$$s_p(p_1, p_2) = \frac{1}{\|p_1 - p_2\|_2} \qquad (10)$$

According to Modified Example 2, in the similarity calculation, the use of the evaluation value for the location of each tracking target, as well as the feature value obtained from the CNN as described above, makes it possible to increase the accuracy of collation and tracking. Modified Example 2 can also be applied to the first exemplary embodiment and Modified Example 1 described above.

Modified Example 3

The threshold calculation unit 204 according to the first exemplary embodiment described above calculates one similarity threshold as represented by Expression (4) or Expression (8).

In Modified Example 3 of the first exemplary embodiment, an example will be described where the similarity threshold is set for each tracking target. For example, when the similarity threshold corresponding to an i-th tracking target among a plurality of tracking targets detected from the image is represented by $Th_i$, the threshold calculation unit 204 calculates a similarity threshold $Th_i$ by the following expression (11).

$$Th_i = \alpha \text{intra}_{mean} + (1-\alpha)\bar{s}_i \qquad (11)$$

In Expression (11), $\alpha$ is a value that satisfies $0 \leq \alpha < 1$ and is empirically determined. In Expression (11), $\text{intra}_{mean}$ is used. Instead of $\text{intra}_{mean}$, $\text{intra}_{std}$, $\text{inter}_{mean}$, or $\text{inter}_{std}$ may be used.

According to Modified Example 3, the similarity threshold is calculated for each tracking target, thereby facilitating tracking of, for example, the tracking target with its feature value that drastically varies compared with other tracking targets. Modified Example 3 can also be applied to the first exemplary embodiment, Modified Example 1, and Modified Example 2 described above.

A second exemplary embodiment will now be described. The information processing apparatus 100 according to the first exemplary embodiment described above calculates the similarity threshold based on the similarity distribution.

In the second exemplary embodiment, an example will be described where a similarity is corrected based on the similarity distribution, instead of changing the similarity threshold based on the similarity distribution. The information processing apparatus 100 according to the second exemplary embodiment corrects the similarity based on at least one of the distribution of similarities between identical tracking targets or the distribution of similarities between different tracking targets. The hardware configuration of the information processing apparatus 100 according to the second exemplary embodiment is similar to that illustrated in FIG. 1 described above, and thus the illustration and descriptions thereof will be omitted.

Figure 9:
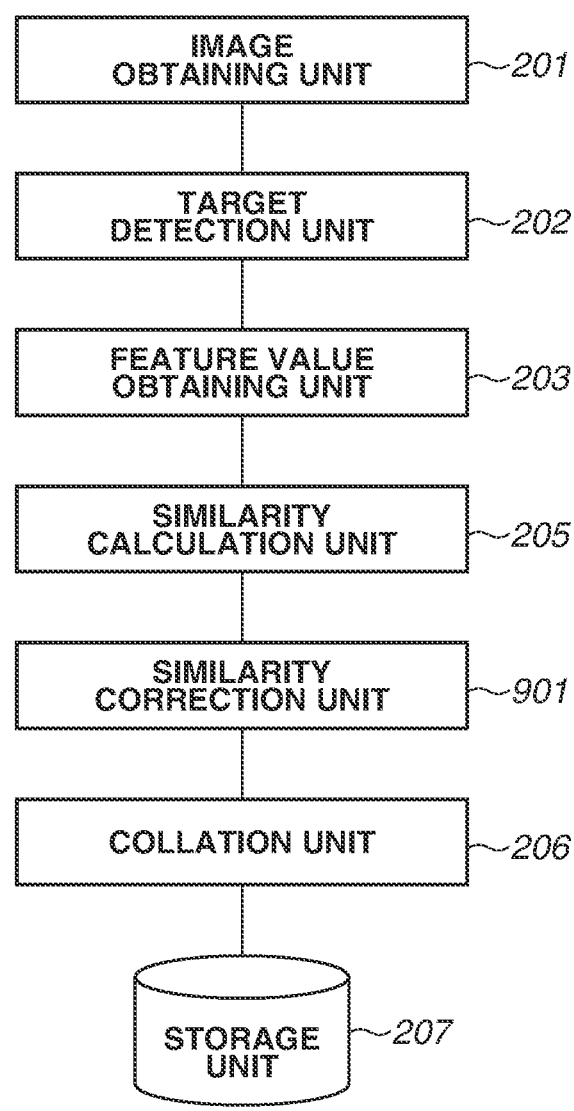
FIG. 9 is a block diagram illustrating a functional configuration example of an information processing apparatus according to a second exemplary embodiment.

FIG. 9 is a block diagram illustrating a functional configuration example of the information processing apparatus 100 according to the second exemplary embodiment. The image obtaining unit 201, the target detection unit 202, the feature value obtaining unit 203, the similarity calculation unit 205, the collation unit 206, and the storage unit 207 are similar to the respective corresponding functional units according to the first exemplary embodiment described above. Also, in the second exemplary embodiment, the functional units are each connected to the storage unit 207. The storage unit 207 may be included in the information processing apparatus 100. Each functional unit in the information processing apparatus 100 according to the second exemplary embodiment is implemented by for example, the CPU 101 in FIG. 1 running an information processing program according to the second exemplary embodiment. Alternatively, some or all of the functional units may be implemented by hardware components such as circuits.

As illustrated in FIG. 9, the information processing apparatus 100 according to the second exemplary embodiment includes a similarity correction unit 901. The similarity correction unit 901 receives the similarity of each tracking target in the current image calculated by the similarity calculation unit 205, and obtains the previous similarities of each tracking target stored in the storage unit 207.

In the second exemplary embodiment, the similarity correction unit 901 and the collation unit 206 are provided as evaluation collation functional units. The evaluation collation functional units according to the second exemplary embodiment correct the similarity of a tracking target in the current image based on the similarity of the tracking target in the current image and the distribution of the previous similarities of the tracking target, and perform collation processing using the corrected similarity. In the second exemplary embodiment, the similarity threshold used for the collation unit 206 to perform collation processing is a fixed threshold empirically determined, unlike in the first exemplary embodiment described above.

Figure 10:
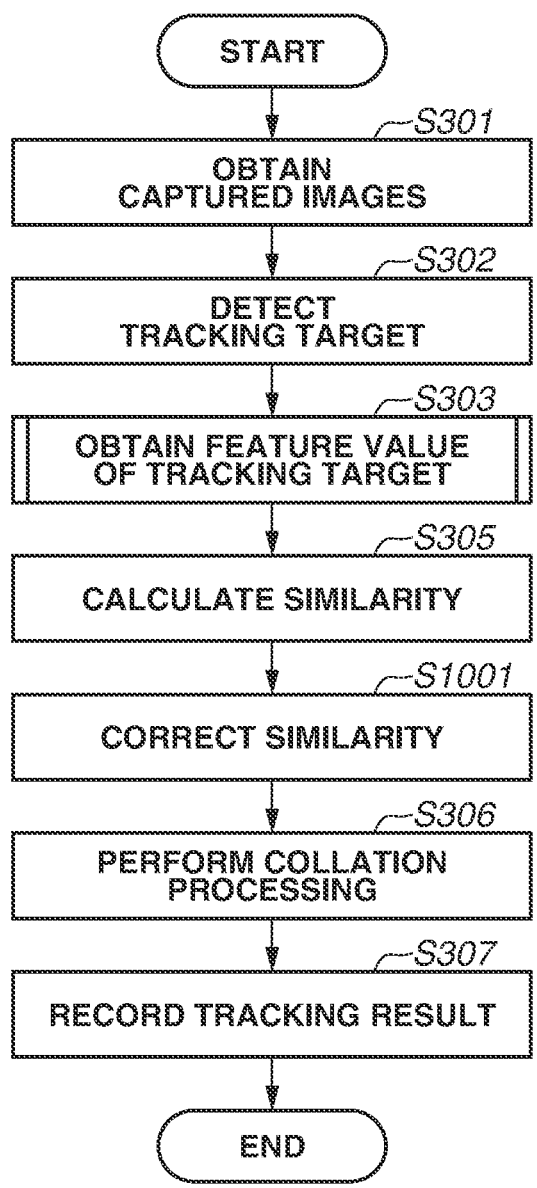
FIG. 10 is a flowchart illustrating an information processing procedure according to the second exemplary embodiment.

FIG. 10 is a flowchart illustrating a procedure of information processing to be performed by the information processing apparatus 100 according to the second exemplary embodiment. In the flowchart illustrated in FIG. 10, steps S301, S302, S303, S305, S306, and S307 are similar to the respective corresponding steps in FIG. 3 described above, and thus the descriptions thereof will be omitted. In the second exemplary embodiment, the tracking target feature value obtaining processing in step S303 is performed, and then the similarity calculation processing in step S305 is performed. After that, similarity correction processing in step S1001 is performed, and then the collation processing in step S306 is performed.

In step S1001, the similarity correction unit 901 calculates the distribution of similarities between identical tracking targets and the distribution of similarities between different tracking targets in the same manner as described above. Further, the similarity correction unit 901 corrects the similarity of each tracking target in the current image calculated by the similarity calculation unit 205 based on the similarity distributions. Specifically, the similarity correction unit 901 performs a correction operation as represented by the following expression (12), for example, on the similarity "s" of each tracking target in the current image calculated by the similarity calculation unit 205, thereby calculating a corrected similarity s'. In Expression (12), $Th_{std}$ represents a fixed similarity threshold empirically determined.

$$s'(f_1, f_2) = s(f_1, f_2)\exp(\alpha(Th_{std} - \text{intra}_{mean})) \quad (12)$$

In Expression (12), $\text{intra}_{mean}$ is used as a coefficient for the correction operation. Instead of $\text{intra}_{mean}$, $\text{intra}_{std}$, $\text{inter}_{mean}$, or $\text{inter}_{std}$ may be used. Specifically, the similarity correction unit 901 according to the second exemplary embodiment corrects the similarity of each tracking target in the current image based on a coefficient corresponding to at least one of a statistic based on the distribution of similarities between identical tracking targets or a statistic based on the distribution of similarities between different tracking targets.

Thus, the information processing apparatus 100 according to the second exemplary embodiment corrects the similarity of each tracking target in the current image based on the distribution of the previous similarities. Thus, for example, correction processing is performed on the tracking target with a feature value that greatly varies with time so that the similarity of the tracking target increases. This makes it possible to easily maintain tracking. On the other hand, for example, correction processing is performed on the tracking target with a feature value that varies a little with time so that the similarity of the tracking target decreases. This makes it possible to reduce occurrences of tracking errors such as tracking of another tracking target by mistake.

A third exemplary embodiment will now be described. In the third exemplary embodiment, the information processing apparatus 100 determines whether a trajectory obtained by tracking a tracking target, that is, a tracklet is segmented. In the third exemplary embodiment, an example will be where if the tracklet of the same tracking target is segmented, the information processing apparatus 100 enables the same tracking target to be continuously tracked. The hardware configuration of the information processing apparatus 100 according to the third exemplary embodiment is similar to that illustrated in FIG. 1 described above, and thus the illustration and descriptions thereof will be omitted.

Figure 11:
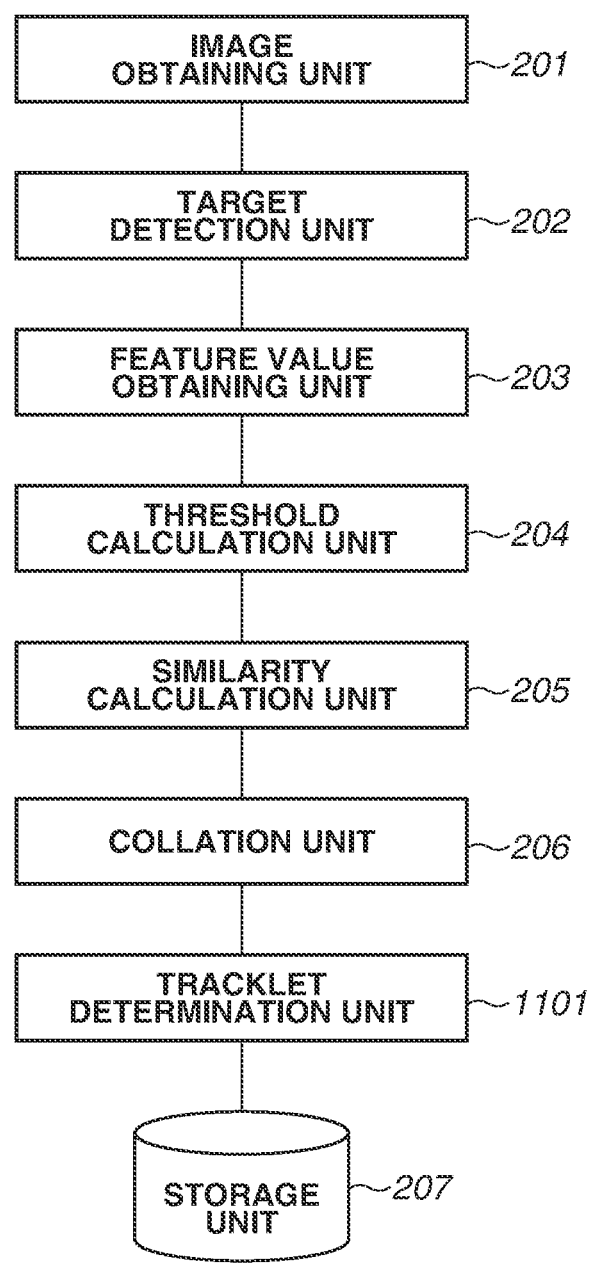
FIG. 11 is a block diagram illustrating a functional configuration example of an information processing apparatus according to a third exemplary embodiment.

FIG. 11 is a block diagram illustrating a functional configuration example of the information processing apparatus 100 according to the third exemplary embodiment. The image obtaining unit 201, the target detection unit 202, the feature value obtaining unit 203, and the storage unit 207 are similar to the respective corresponding functional units according to the first exemplary embodiment.

The information processing apparatus 100 according to the third exemplary embodiment also includes a tracklet determination unit 1101. In the third exemplary embodiment, the threshold calculation unit 204, the similarity calculation unit 205, and the collation unit 206 also perform the processing in which tracklets are taken into consideration. Also, in the third exemplary embodiment, the functional units are each connected to the storage unit 207. The storage unit 207 may be included in the information processing apparatus 100. Each functional unit in the information processing apparatus 100 according to the third exemplary embodiment is implemented by the CPU 101 in FIG. 1 running an information processing program according to the third exemplary embodiment by way of example. Alternatively, some or all of the functional units may be implemented by hardware components such as circuits.

In the third exemplary embodiment, the tracklet determination unit 1101 receives information about the tracking result based on the result of collation processing performed by the collation unit 206. The tracklet determination unit 1101 determines whether a tracklet obtained by tracking is segmented and a new tracklet is obtained based on the tracking result from the collation unit 206.

Figure 12:
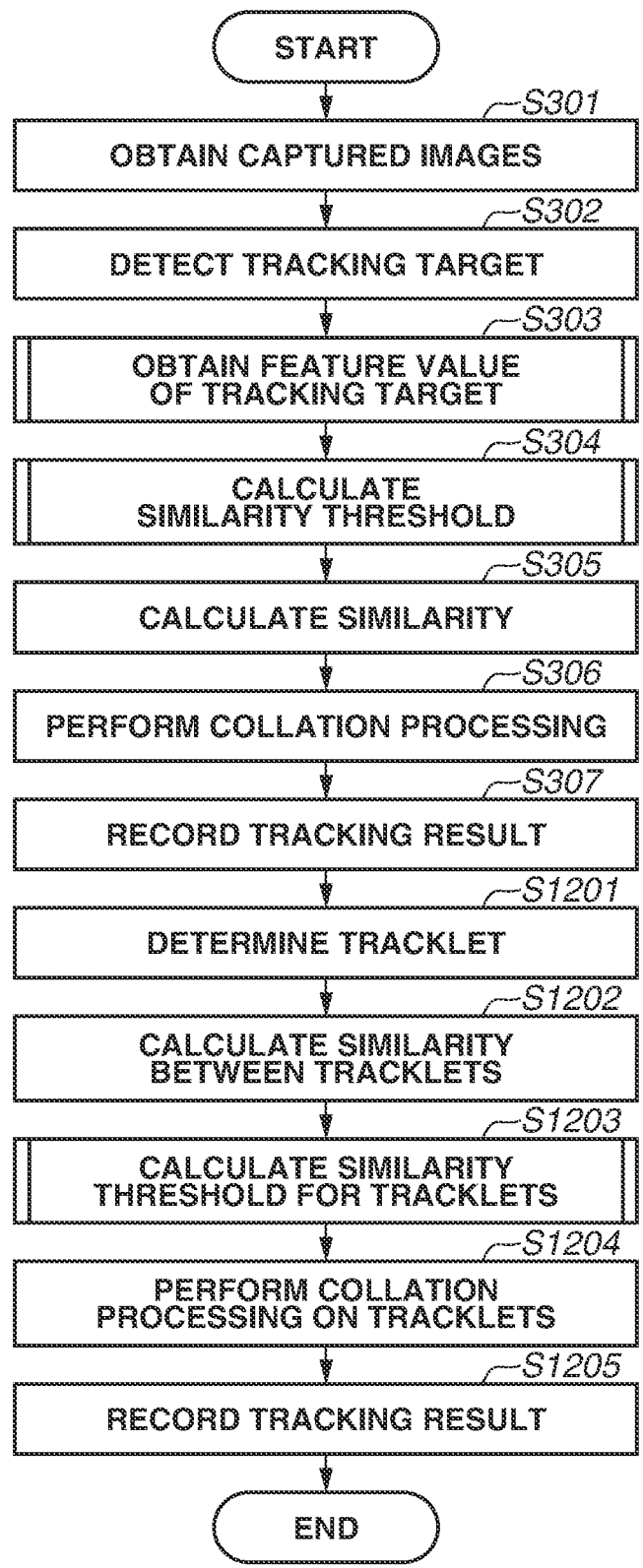
FIG. 12 is a flowchart illustrating an information processing procedure according to the third exemplary embodiment.

FIG. 12 is a flowchart illustrating a procedure of information processing to be performed by the information processing apparatus 100 according to the third exemplary embodiment. In the flowchart illustrated in FIG. 12, steps S301 to S307 are similar to the corresponding steps in FIG. 3 described above, and thus the descriptions thereof will be omitted.

In the third exemplary embodiment, the collation processing in step S307 is performed, and then the processing of step S1201 and subsequent steps is performed.

In step S1201, the tracklet determination unit 1101 determines whether the tracking trajectory is segmented and a new tracklet is obtained based on the information about the tracking result in the collation processing performed in step S307.

Figure 13:
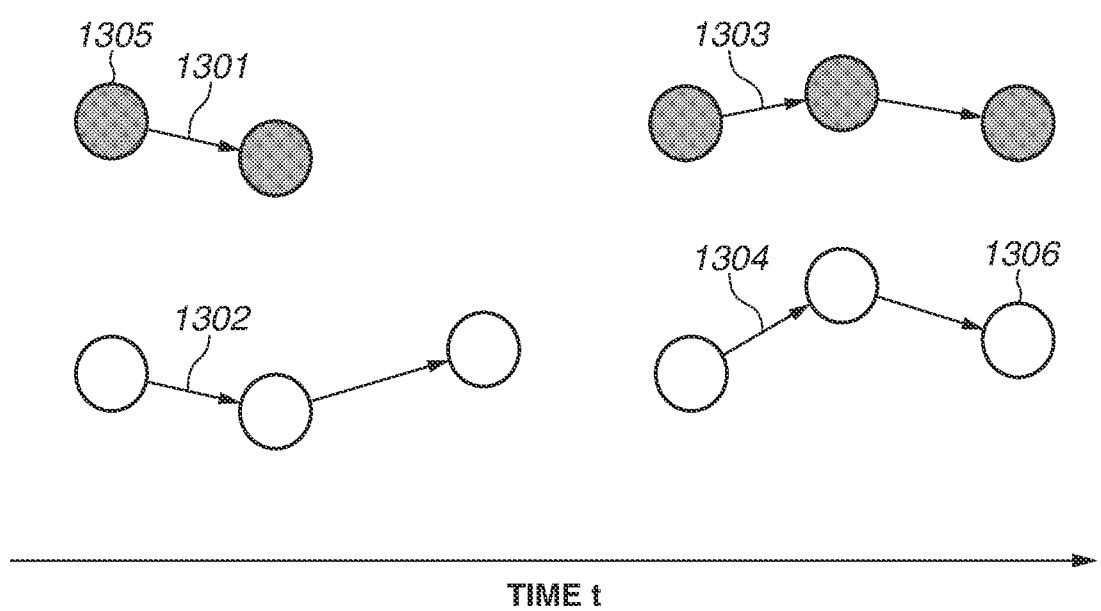
FIG. 13 is a conceptual diagram illustrating tracklets.

FIG. 13 is conceptual diagram illustrating tracklets. Circles 1305, 1306, and the like illustrated in FIG. 13 represent locations of the tracking targets detected at different times. The circles representing the tracking targets determined to be identical at different times are connected with arrows, thereby representing each tracklet as the tracking trajectory. Each tracklet corresponds to the temporally continuous tracking trajectory. If the tracklet ends at a certain time, a new tracklet is generated. In the example illustrated in FIG. 13, the trajectories obtained by connecting the circles representing the tracking targets determined to be identical indicate tracklets 1301, 1302, 1303, and 1304. The information about the feature value and the similarity of each tracking target at different times described above is associated with the corresponding tracklet based on the tracklet determination result obtained by the tracklet determination unit 1101, and the information associated with the corresponding tracklet is stored in the storage unit 207.

In step S1202, the similarity calculation unit 205 according to the third exemplary embodiment calculates an evaluation value between different tracklets based on the feature value of each tracking target for each tracklet stored in the storage unit 207. Specifically, the similarity calculation unit 205 according to the third exemplary embodiment performs the processing of calculating the similarity between different tracklets as the evaluation value between tracklets as well as the processing of calculating the similarity of each tracking target described above. For example, when one of two tracklets is set as a first tracklet and the other of the two tracklets is set as a second tracklet, the similarity calculation unit 205 obtains the similarity between the first tracklet and the second tracklet as the similarity between tracklets.

A similarity $s_{TL}$ between tracklets can be calculated by the following expression (13).

Expression (13) is a formula for calculating the similarity between two tracklets. In Expression (13), $f_1$ represents the feature value of each tracking target belonging to one of the tracklets, and $f_2$ represents the feature value of each tracking target belonging to the other of the tracklets. Information about the similarities between tracklets calculated by the formula is stored in the storage unit 207.

$$s_{TL} = (\bar{f_1}, \bar{f_2}) = \frac{\bar{f_1} \cdot \bar{f_2}}{|\bar{f_1}||\bar{f_2}|} \quad (13)$$

where $\bar{f_i}$ represents the average of feature values of each tracklet.

In step S1203, the threshold calculation unit 204 according to the third exemplary embodiment calculates a similarity threshold for tracklets. The threshold calculation unit 204 according to the third exemplary embodiment obtains the information about the similarities that are calculated for each tracking target in the tracklet by the similarity calculation processing in step S305 and are stored in the storage unit 207, and calculates the similarity threshold for tracklets based on the distribution of the similarities. In the third exemplary embodiment, the threshold calculation unit 204 obtains the distribution of the similarities between identical tracking targets calculated in the processing of step S304 as the similarity distribution in the tracklet, and obtains the distribution of similarities between tracklets based on the similarity between different tracking targets. Further, the threshold calculation unit 204 calculates the similarity threshold for tracklets based on the distribution of similarities in the tracklets and the distribution of similarities between the tracklets.

For example, when two tracklets are set as the first tracklet and the second tracklet, respectively, the similarity between tracking targets in the first tracklet corresponds to the similarity between identical tracking targets, and the distribution of the similarities corresponds to the distribution of the similarities in the first tracklet. Similarly, the similarity between tracking targets in the second tracklet corresponds to the similarity between identical tracking targets in the tracklet, and the distribution of the similarities corresponds to the distribution of the similarities in the second tracklet. On the other hand, the tracking targets in the second tracklet are the tracking targets determined to be different tracking targets in collation processing performed on the tracking targets in the first tracklet. Thus, the similarity between the tracking targets in the second tracklet with respect to the tracking targets in the first tracklet corresponds to the similarity between different tracking targets. As viewed from each tracking target in the first tracklet, the distribution of similarities between tracklets corresponds to the distribution of similarities between the tracking targets in the second tracklet.

The threshold calculation unit 204 calculates the average $inter_{mean}$ of the similarities between tracklets by Expression (2) described above as a statistic based on the distribution of similarities between tracklets. Further, the threshold calculation unit 204 calculates the standard deviation $inter_{std}$ of the similarities between tracklets by Expression (3) described above. Further, the threshold calculation unit 204 calculates the average $intra_{mean}$ of the similarities in the tracklet by Expression (5) described above as a statistic based on the distribution of the similarities in the tracklet.

The threshold calculation unit 204 calculates the standard deviation $intra_{std}$ of the similarity in the tracklet by Expression (6). Further, the threshold calculation unit 204 calculates a similarity threshold $Th_{TL}$ for tracklets by the following expression (14) based on the above-described calculated values. In Expression (14), $\lambda_1$ and $\lambda_2$ correspond to $\lambda$ in Expression (4) and $\lambda$ in Expression (8), respectively.

$$Th_{TL}=\max(intra_{mean}-\lambda_1 intra_{std}, inter_{mean}+\lambda_2 inter_{std}) \quad (14)$$

In step S1204, the collation unit 206 according to the third exemplary embodiment performs collation processing on the tracklets using the similarity $s_{TL}$ between tracklets calculated in step S1202 and the similarity threshold $Th_{TL}$ for tracklets calculated in step S1203. Assume herein that the similarities between the tracklets 1301, 1302, 1303, and 1304 illustrated in FIG. 13 described above are calculated, for example, as illustrated in Table 2 described below. Assume that the similarity threshold for tracklets calculated in step S1203 is 0.5.

TABLE 2

| Similarity between Tracklets | | |
|---|---|---|
| Tracklet | 1301 | 1302 |
| 1303 | 0.8 | 0.1 |
| 1304 | 0.3 | 0.4 |

In the example illustrated in Table 2, the tracklet 1301 is the more similar to the tracklet 1303 and the similarity between the tracklet 1301 and the tracklet 1303 is more than the similarity threshold "0.5". Thus, it can be inferred that the tracklets 1301 and 1303 are tracklets of the same tracking target. On the other hand, the tracklet 1302 is the more similar to the tracklet 1304. However, in this case, the similarity between the tracklet 1304 and the tracklet 1302 is "0.4", which is lower than the similarity threshold "0.5". Thus, it can be inferred that the tracklets 1304 and 1302 are tracklets of different tracking targets, respectively.

In step S1205, the collation unit 206 obtains one tracklet by connecting the tracklets that are determined to be the tracklets associated with the same tracking target in step S1204.

In the example illustrated in Table 2, the collation unit 206 connects the tracklet 1303 to the tracklet 1301, thereby generating one tracklet. In the case of connecting the tracklets, the collation unit 206 updates the tracking result based on information about the connected tracklets and records the updated tracking result on the storage unit 207.

According to the third exemplary embodiment, even when the tracklet of the tracking trajectory for the same tracking target is segmented, for example, the same tracking target can be continuously tracked.

Also, in the third exemplary embodiment, similarity correction processing may be performed like in the second exemplary embodiment described above. The third exemplary embodiment can also be applied to the first exemplary embodiment, Modified Example 1, Modified Example 2, and Modified Example 3 described above.

The information processing apparatus 100 according to the third exemplary embodiment can connect tracklets obtained by a plurality of cameras, as well as tracklets of tracking targets detected from images captured by one camera. Specifically, for example, the information processing apparatus 100 according to the third exemplary embodiment can connect the first tracklet of each tracking target detected from images captured by a first camera and the second tracklet of each tracking target detected from images captured by a second camera. In this case, the above-described tracking target detection processing, feature value obtaining processing, similarity calculation processing, processing of obtaining the similarity between tracklets, and the like may be performed on the images captured by both the first camera and the second camera. Further, the calculation of the distribution of similarities in each tracklet, the calculation of the distribution of similarities between tracklets, the calculation of the similarity threshold for tracklets, and the like may be performed. If the similarity between tracklets is more than or equal to the similarity threshold for tracklets, the tracklets are connected. Thus, the number of cameras to be used in the present exemplary embodiment is not particularly limited.

While in the above-described exemplary embodiments, an example has been described where a person is set as a tracking target to be collated, a vehicle or other objects may also be set as the tracking target. While in the above-described exemplary embodiments, an example has been described where the similarity between feature values of tracking target images is used as the evaluation value, the evaluation value is not limited to the similarity between feature values. For example, various information such as a coincidence or dissimilarity may be used.

The present disclosure can also be implemented by the following processing. That is, a program for implementing one or more functions according to the exemplary embodiments described above is supplied to a system or an apparatus via a network or storage medium, and one or more processors in a computer of the system or the apparatus read out and run the program. The present disclosure can also be implemented by a circuit (e.g., an application specific integrated circuit (ASIC)) for implementing one or more functions according to the exemplary embodiments.

The above-described exemplary embodiments are merely specific examples for carrying out the present disclosure, and the technical scope of the present disclosure should not be limitedly interpreted by these specific examples.

That is, the present disclosure can be carried out in various forms without departing from the technical idea and principal features of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-056816, filed Mar. 30, 2022, which is hereby incorporated by reference herein in its entirety.

What is claimed is:

1. An information processing apparatus that tracks a subject, the information processing apparatus comprising:
a memory storing instructions; and
a processor which, when executing the instructions, causes the information processing apparatus to:
detect a collation target from an image;
obtain a predetermined evaluation value between the collation target previously detected and the collation target detected from the image; and
control tracking of a tracking target by comparing the collation target previously detected with the collation target detected from the image based on the evaluation value obtained for the collation target detected from the image and a distribution of evaluation values previously obtained,
wherein the controlling treats, as one tracklet, the collation targets determined to be identical in the collation at different times,
wherein the obtaining further obtains an evaluation value for tracklets between a first tracklet and a second tracklet different from the first tracklet,
wherein the controlling sets a threshold for the tracklets based on a distribution of evaluation values for the collation targets in the first tracklet and a distribution of evaluation values between the collation targets in the first tracklet and the collation targets in the second tracklet, and
wherein in a case where the evaluation value for the tracklets is more than or equal to the threshold for the tracklets, the first tracklet and the second tracklet are connected.

2. The information processing apparatus according to claim 1, wherein the obtaining obtains, as the evaluation value, a similarity between a feature value of the collation target previously detected and a feature value of the collation target detected from the image.

3. The information processing apparatus according to claim 1, wherein the controlling sets a threshold used for collation to determine whether the collation target detected from the image is identical to the collation target previously detected based on at least one of a distribution of evaluation values for the collation target determined to be identical in the collation or a distribution of evaluation values for the collation target determined to be different in the collation.

4. The information processing apparatus according to claim 3, wherein the controlling sets the threshold based on at least one of a statistic based on the distribution of evaluation values for the collation target determined to be identical in the collation or a statistic based on the distribution of evaluation values for the collation target determined to be different in the collation.

5. The information processing apparatus according to claim 4, wherein the controlling sets the threshold to a higher value as an average of the evaluation values for the collation target determined to be identical in the collation increases.

6. The information processing apparatus according to claim 4, wherein the controlling sets the threshold to a lower value as a standard deviation or a variance of the evaluation values for the collation target determined to be identical in the collation increases.

7. The information processing apparatus according to claim 4, wherein the controlling sets the threshold to a higher value as an average, a standard deviation, or a variance of the evaluation values for the collation target determined to be different in the collation increases.

8. The information processing apparatus according to claim 4, wherein the controlling sets the threshold to a higher value as an average of the evaluation values for the collation target determined to be identical in the collation decreases and as an average of the evaluation values for the collation target determined to be different in the collation increases.

9. The information processing apparatus according to claim 3, wherein the controlling sets, as the threshold, a higher one of the threshold calculated based on the distribution of evaluation values for the collation target determined to be identical in the collation and the threshold calculated based on the distribution of evaluation values for the collation target determined to be different in the collation.

10. The information processing apparatus according to claim 3, wherein in a case where the evaluation value obtained for the collation target detected from the image is more than or equal to the threshold, the controlling determines the collation target detected from the image to be identical to the collation target previously detected.

11. The information processing apparatus according to claim 3, wherein the controlling sets the threshold for each of the collation targets.

12. The information processing apparatus according to claim 1,
wherein the obtaining further obtains an evaluation value for a location of the collation target in the image, and
wherein the controlling performs the collation by adding the evaluation value for the location.

13. The information processing apparatus according to claim 1, wherein the controlling corrects the evaluation value obtained in the obtaining for the collation target detected from the image based on at least one of a distribution of evaluation values for the collation target determined to be identical in the collation or a distribution of evaluation values for the collation target determined to be different in the collation.

14. The information processing apparatus according to claim 13, wherein the controlling corrects a similarity between a feature value of the collation target previously detected and a feature value of the collation target detected from the image based on a coefficient corresponding to at least one of a statistic based on the distribution of evaluation values for the collation target determined to be identical in the collation or a statistic based on the distribution of evaluation values for the collation target determined to be different in the collation.

15. The information processing apparatus according to claim 13, wherein in a case where the corrected evaluation value is more than or equal to a predetermined threshold, the controlling determines the collation target detected from the image to be identical to the collation target previously detected.

16. The information processing apparatus according to claim 1, wherein the obtaining obtains, as the evaluation value for the tracklets, a similarity between an average of feature values of the collation targets in the first tracklet and an average of feature values of the collation targets in the second tracklet.

17. The information processing apparatus according to claim 1,
wherein the processor further causes the information processing apparatus to determine whether the tracklets including the collation targets determined to be identical in the collation at the different times are segmented, and wherein one of the tracklets determined to be segmented is treated as the first tracklet, and the other of the tracklets is treated as the second tracklet.

18. The information processing apparatus according to claim 1, wherein the first tracklet and the second tracklet are tracklets of each collation target detected from an image captured by an image capturing apparatus.

19. The information processing apparatus according to claim 1,
wherein the first tracklet is a tracklet of each collation target detected from an image captured by a first image capturing apparatus, and
wherein the second tracklet is a tracklet of each collation target detected from an image captured by a second image capturing apparatus different from the first image capturing apparatus.

20. An information processing method to be executed by an information processing apparatus configured to track a subject, the information processing method comprising:
detecting a collation target from an image;
obtaining a predetermined evaluation value between the collation target previously detected and the collation target detected from the image; and
controlling tracking of a tracking target by comparing the collation target previously detected with the collation target detected from the image based on the evaluation value obtained for the collation target detected from the image and a distribution of evaluation values previously obtained,
wherein the controlling treats, as one tracklet, the collation targets determined to be identical in the collation at different times,
wherein the obtaining further obtains an evaluation value for tracklets between a first tracklet and a second tracklet different from the first tracklet,
wherein the controlling sets a threshold for the tracklets based on a distribution of evaluation values for the collation targets in the first tracklet and a distribution of evaluation values between the collation targets in the first tracklet and the collation targets in the second tracklet, and
wherein in a case where the evaluation value for the tracklets is more than or equal to the threshold for the tracklets, the first tracklet and the second tracklet are connected.

21. A non-transitory storage medium storing a program for causing a computer to execute an information processing method to be executed by an information processing apparatus configured to track a subject, the information processing method comprising:
detecting a collation target from an image;
obtaining a predetermined evaluation value between the collation target previously detected and the collation target detected from the image; and
controlling tracking of a tracking target by comparing the collation target previously detected with the collation target detected from the image based on the evaluation value obtained for the collation target detected from the image and a distribution of evaluation values previously obtained,
wherein the controlling treats, as one tracklet, the collation targets determined to be identical in the collation at different times,
wherein the obtaining further obtains an evaluation value for tracklets between a first tracklet and a second tracklet different from the first tracklet,
wherein the controlling sets a threshold for the tracklets based on a distribution of evaluation values for the collation targets in the first tracklet and a distribution of evaluation values between the collation targets in the first tracklet and the collation targets in the second tracklet, and
wherein in a case where the evaluation value for the tracklets is more than or equal to the threshold for the tracklets, the first tracklet and the second tracklet are connected.

* * * * *